United States Patent
Mabey et al.

(10) Patent No.: US 10,243,390 B1
(45) Date of Patent: Mar. 26, 2019

(54) PADFOLIO FOR ELECTRONIC TABLET WITH SOFT CORNERS, INDUCTIVE CHARGING DEVICE AND EXTRA BATTERY STORAGE

(71) Applicant: QuirkLogic, Inc., Calgary (CA)

(72) Inventors: Michael Howatt Mabey, Calgary (CA); Alfonso Fabian de la Fuente, Victoria (CA)

(73) Assignee: Quirklogic, Inc., Calgary (CA)

( * ) Notice: Subject to any disclaimer, the term of this patent is extended or adjusted under 35 U.S.C. 154(b) by 129 days.

(21) Appl. No.: 14/976,802

(22) Filed: Dec. 21, 2015

(51) Int. Cl.
*H02J 7/00* (2006.01)
*H02J 7/02* (2016.01)

(52) U.S. Cl.
CPC ............ *H02J 7/025* (2013.01); *H02J 7/0044* (2013.01); *H02J 7/0054* (2013.01)

(58) Field of Classification Search
CPC .. H02J 7/025; H02J 50/00; H02J 50/10; H02J 5/005; H02J 7/0044; H02J 7/0054
USPC ................................................ 320/103, 108
See application file for complete search history.

(56) References Cited

U.S. PATENT DOCUMENTS

| | | | | |
|---|---|---|---|---|
| 2010/0323616 A1* | 12/2010 | Von Novak | ........... | H02J 7/0054 455/41.1 |
| 2013/0063873 A1* | 3/2013 | Wodrich | ............... | G06F 1/1635 361/679.01 |
| 2013/0335003 A1* | 12/2013 | Buhler | .................. | H02J 7/0042 320/103 |
| 2014/0083997 A1* | 3/2014 | Chen | ...................... | A45C 11/00 220/4.02 |
| 2014/0085815 A1* | 3/2014 | Filipovic | ............... | G06F 1/1633 361/679.56 |
| 2014/0253024 A1* | 9/2014 | Rautiainen | .............. | H02J 7/025 320/108 |
| 2015/0272303 A1* | 10/2015 | Brown | .................... | A45C 11/00 224/191 |
| 2016/0241076 A1* | 8/2016 | Bowers | ................. | G06F 1/1632 |
| 2016/0345628 A1* | 12/2016 | Sabet | ...................... | A24F 15/18 |

* cited by examiner

*Primary Examiner* — Nathaniel Pelton
(74) *Attorney, Agent, or Firm* — Chamberlain, Hrdlicka, White, Williams & Aughtry

(57) ABSTRACT

In general, embodiments of the invention relate to an apparatus for housing and (re)charging one or two mobile computing device(s). More specifically, in one or more embodiments of the invention, the apparatus includes an inductive (re)charging element, which generates direct current (DC) when proximal to external power sources extending electromagnetic (EM) fields. The generated DC may then be disseminated, through a physical connection, towards (re) charging the one or two mobile computing device(s) and/or a backup battery. Subsequently, the battery provides DC, that had been stored, to (re)charge the one or two mobile computing device(s) whenever the apparatus is not proximal to an EM field inducing external power source.

13 Claims, 11 Drawing Sheets

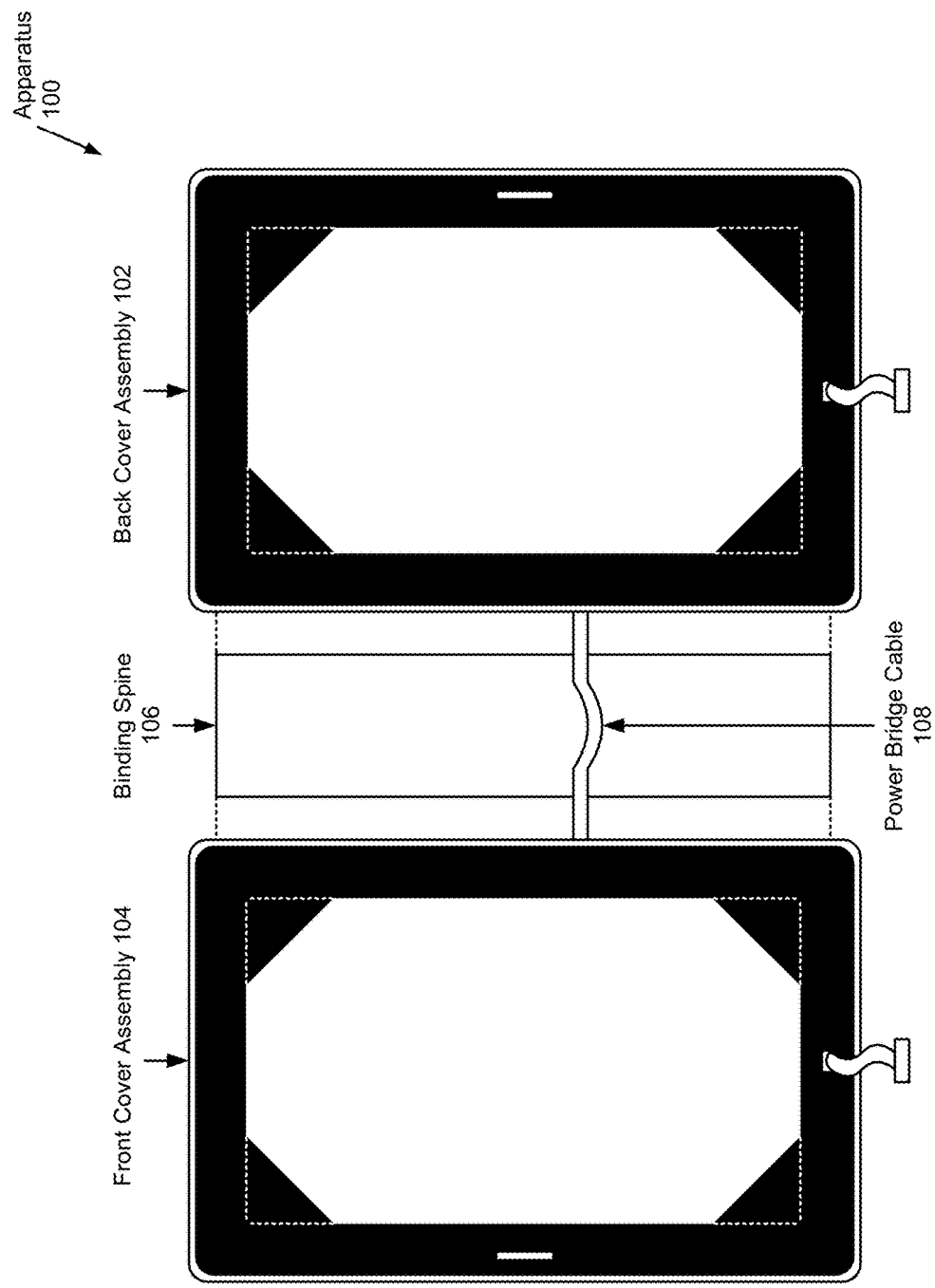

US 10,243,390 B1

PADFOLIO FOR ELECTRONIC TABLET WITH SOFT CORNERS, INDUCTIVE CHARGING DEVICE AND EXTRA BATTERY STORAGE

BACKGROUND

Mobile computing devices, such as computer tablets and electronic book readers, are becoming ever more essential utilities for people on the go. As such, various accessories, which provide various extensions onto these devices, are more and more commonplace.

SUMMARY

In general, in one aspect, the invention relates to an apparatus. The apparatus includes a back cover assembly comprising a back cover and an inductive power unit (IPU), and a front cover operatively connected to the back cover, wherein the IPU is affixed to an inside surface of the back cover, wherein the binding spine attaches the back cover to the front cover.

Other aspects of the invention will be apparent from the following description and the appended claims.

BRIEF DESCRIPTION OF DRAWINGS

FIG. 1 shows an apparatus in accordance with one or more embodiments of the invention.

DETAILED DESCRIPTION

Figure 2A:
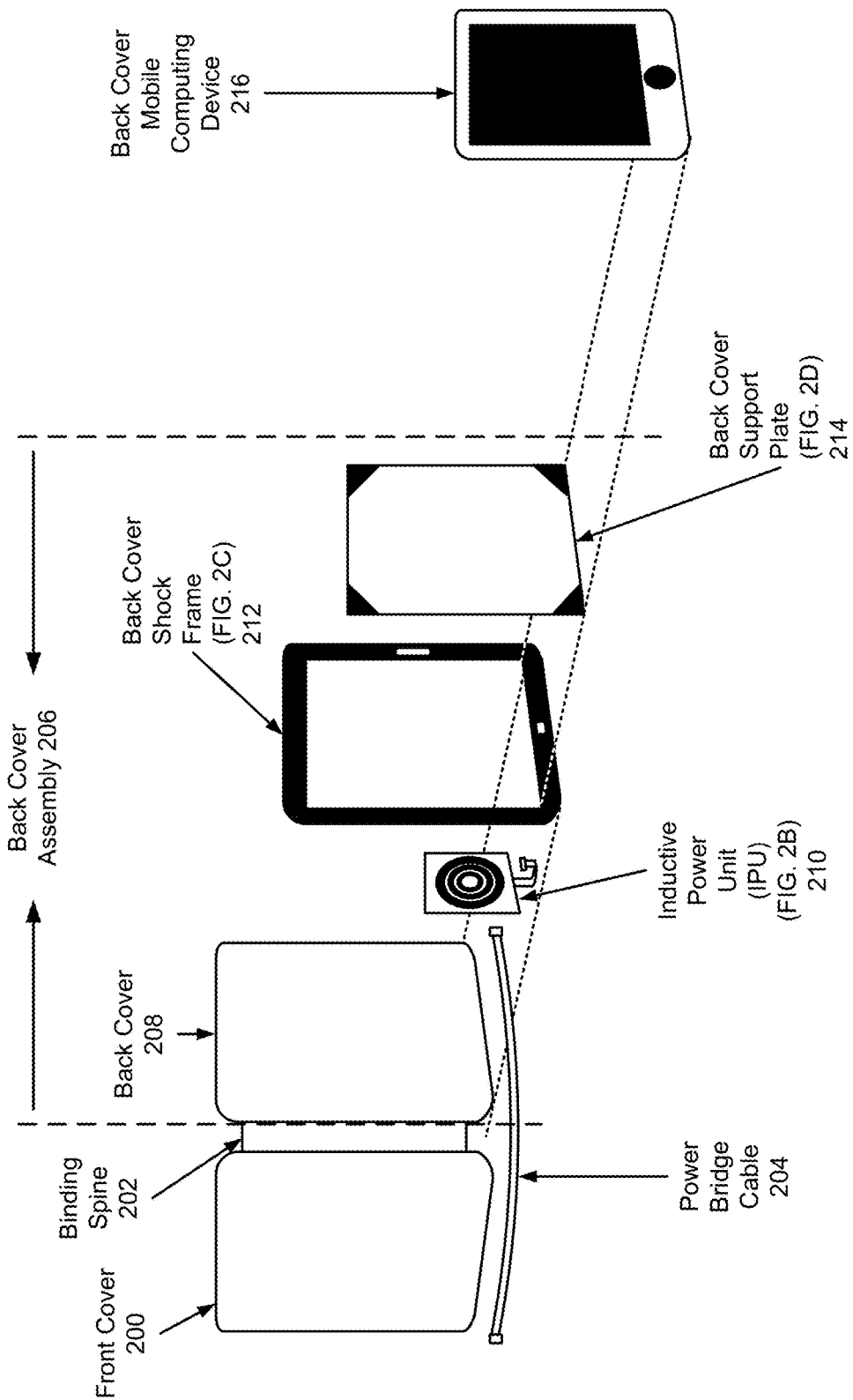
FIG. 2A shows a back cover assembly in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any elements to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4D, any component description with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to an apparatus for housing and (re)charging one or two mobile computing device(s). More specifically, in one or more embodiments of the invention, the apparatus includes an inductive (re)charging element, which generates direct current (DC) when proximal to external power sources extending electromagnetic (EM) fields. The generated DC may then be disseminated, through a physical connection, towards (re)charging the one or two mobile computing device(s) and/or a backup battery. Subsequently, the battery provides DC, that had been stored, to (re)charge the one or two mobile computing device(s) whenever the apparatus is not proximal to an EM field inducing external power source.

FIG. 1 shows an apparatus in accordance with one or more embodiments of the invention. More specifically, an apparatus (100) in an open configuration, thereby revealing an interior perspective, is presented in FIG. 1. The apparatus includes a back cover assembly (102), a front cover assembly (104), and a binding spine (106). In one embodiment of the invention, the apparatus may additionally include a power bridge cable (108). Each of these components is described below.

In one embodiment of the invention, the apparatus (100) may be a functional, foldable case, which includes functionality to enclose and protect one or two mobile computing device(s). Mobile computing devices, herein, may refer to, for example, computer tablets, electronic book readers, and other equivalent mobile computing devices. In one embodiment of the invention, the size and shape of the apparatus may be scalable to conform to various mobile computing device designs. Further, the apparatus also includes functionality to (re)charge the one or two mobile computing device(s) to which it is connected (e.g., via a power cable (see e.g., 220 in FIG. 2B, 322 in FIG. 3B)).

In one embodiment of the invention, subsequent to (re) charging mobile computing devices, the apparatus (100) includes functionality to generate direct current (DC) utilizing the mechanism of wireless (or inductive) (re)charging. Inductive (re)charging refers to the transmission of electrical power (and/or current) without the use of a physical medium through which said electrical power (and/or current) traditionally traverses. In one embodiment of the invention, inductive (re)charging may be implemented using contactless coils (or antennae) capable of converting electrical current into electromagnetic (EM) energy, and vice versa. More specifically inductive (re)charging may operate as follows: (i) first, voltage from a source, such as an external power source (not shown), is converted into high frequency alternating current (AC); (ii) next, the AC is passed through a transmitting (TX) coil, operatively connected to the source, which generates an EM field; (iii) afterwards, granted a receiving (RX) coil resides within a specified proximity to the TX coil (and hence, the generated EM field), the generated EM field couples into the RX coil, which generates (or induces) DC in the RX coil; and (iv) lastly, the DC is obtained by a destination (e.g., the apparatus) operatively connected to the RX coil.

In one embodiment of the invention, the apparatus (100) may also include functionality to redirect excess DC, generated via the inductive (re)charging process (discussed above), towards an affixed electrical storage element, such as a battery. The stored DC may be used for (re)charging of the one or two mobile computing device(s) at times when the apparatus is too distant from a source (e.g., an external power source) from which to wirelessly receive electrical power (and/or current). As such, the apparatus may extend the utility of (re)charging connected mobile computing device(s) while operationally mobile (or portable) itself.

Proceeding with the discussion of FIG. 1, in one embodiment of the invention, the back cover assembly (102) may represent a fitting together of assorted components (and/or materials), which provides one or more of the above mentioned functionalities, of the apparatus (100), to a first (or back cover) mobile computing device. Similarly, the front cover assembly (104) may represent a fitting together of assorted components (and/or materials) (both akin and alternative to the components (and/or materials) comprising the back cover assembly), which provides one or more of the above mentioned functionalities, of the apparatus, to, potentially, a second (or front cover) mobile computing device. The back cover assembly (102) and the front cover assembly (104) are disclosed in further detail below with regards to FIGS. 2A and 3A, respectively.

In one embodiment of the invention, the back cover assembly (102) (particularly, the back cover (see e.g., 208 in FIG. 2A)) and the front cover assembly (104) (particularly, the front cover (see e.g., 308 in FIG. 3A)) are adjoined together via a binding spine (106). More specifically, the binding spine may be attached (e.g., stitched, adhered, bonded, etc.) to at least one edge (and/or surface) of the back cover and at least one edge (and/or surface) of the front cover. Furthermore, the binding spine includes functionality to facilitate the foldable functionality (e.g., to accommodate the transition between open and closed configurations, and vice versa) of the apparatus (100). In one embodiment of the invention, the binding spine may be constructed of any durable and flexible material such as fabric, real and/or imitation leather, carbon fiber, felt, fur, suede, etc.

In one embodiment of the invention, the apparatus (100) may include a power bridge cable (108). In such an embodiment, the power bridge cable may serve as a conduit for the flow of direct current (DC) between the back cover assembly (102) and the front cover assembly (104). As such, the power bridge cable may be any flexible electrical cable assembly that includes of one or more electrical conductors (e.g., wires). The power bridge cable may also entail electro-mechanical connectors, operatively connected to exposed wire(s) at each end of the cable assembly, which ease the interface of the power bridge cable with one or more other components (e.g., the inductive power unit (IPU) and the backup power unit (BPU)) of the apparatus.

FIG. 2A shows a back cover assembly in accordance with one or more embodiments of the invention. As presented, the back cover (208), alongside the front cover (200) and the binding spine (202), form the base structure of the apparatus. Further, aside from the back cover, the back cover assembly (206) includes an inductive power unit (IPU) (210), a back cover shock frame (212), and a back cover support plate (214). Each of these components is described below.

In one embodiment of the invention, the back cover (208) represents a portion of the outer, protective covering of the apparatus. The back cover may constitute two layers of materials (not shown): (i) a structural material and (ii) an aesthetic material. The structural material forms the rigid framework of the back cover, which may be composed of, for example, paperboard, plastics, other synthetic materials, wood, etc. In one embodiment of the invention, the structural material may be sheathed (e.g., covered, padded, etc.) with aesthetic material, which may include material consistent with the construction of the binding spine (202) (discussed above) (e.g., fabric, leather, felt, etc.).

In one embodiment of the invention, the inductive power unit (IPU) (210) may be affixed to the inside surface of the back cover (208). The IPU may be any device that generates direct current (DC) resulting from wireless (or inductive) (re)charging, as outlined above. The IPU may include functionality to (re)charge (or provide DC to): (i) a first (or back cover) mobile computing device (214); (ii) an optional second (or front cover) mobile computing device (not shown); and (iii) an optional power (and/or current) storing element (not shown), such as a battery, etc.

Figure 2B:
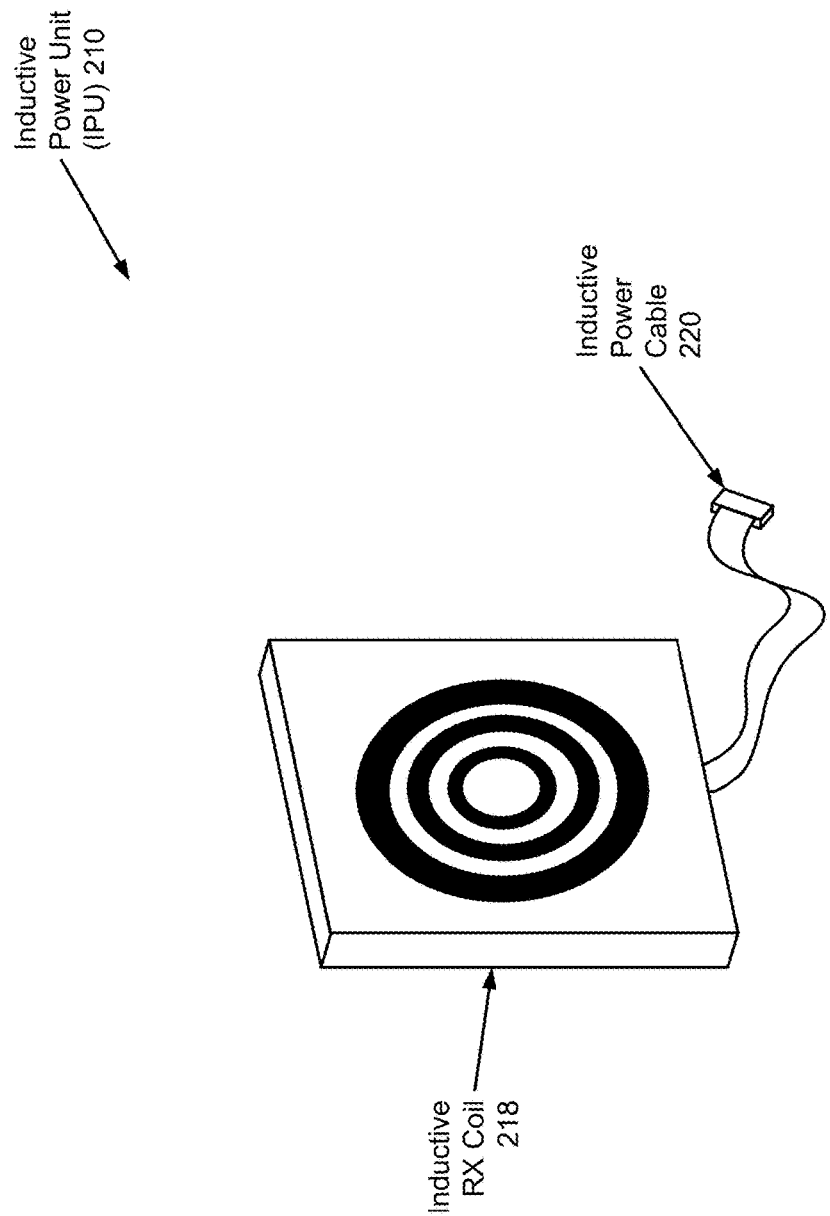
FIG. 2B shows an inductive power unit in accordance with one or more embodiments of the invention.

With respect to the components that implement wireless (or inductive) (re)charging, as described above, the IPU corresponds to the receiving (RX) coil component. FIG. 2B shows an inductive power unit in accordance with one or more embodiments of the invention. Accordingly, the IPU (210) includes the aforementioned (inductive) RX coil (218), which is operatively connected to an inductive power cable (220). Each of these components is described below.

In one embodiment of the invention, the inductive RX coil (218) may be a length of wound-up, insulated copper (and/or silver-plated) wire encapsulated within a thin-walled, non-conductive enclosure. Further, the enclosure may contain a heat sinking element (not shown) through which to dissipate any heat energy produced during the wireless (or inductive) (re)charging process. In one embodiment of the invention, the inductive power cable (220), much like the power bridge cable (see e.g., 108 in FIG. 1), may be any flexible electrical cable assembly consisting of one or more electrical conductors. The inductive power cable serves as a physical conduit to provide direct current (DC) to a first (or back cover) mobile computing device (see e.g., 216 in FIG. 2A); and may interface with said first mobile computing device via any existing or future developed electro-mechanical connector. In one embodiment of the invention, the inductive power unit (IPU) (210) may also be operatively connected to the backup power unit (BPU) (of the front cover assembly) (discussed below) via the power bridge cable. In such an embodiment, the power bridge cable may directly connect to one or more electrical conductors of the inductive power cable (220). Further, in such an embodiment, minimal circuitry (e.g., a diode, etc.) may be integrated into the IPU in order to prevent DC, transferred through the power bridge cable, from propagating to the inductive RX coil (218).

Returning to FIG. 2A, the back cover assembly (206) also includes a back cover shock frame (212). In one embodiment of the invention, the back cover shock frame may be representative of protective edging affixed along the perimeter of the inside surface of the back cover (208). Accordingly, the back cover shock frame may be viewed as a border of material surrounding an opening (of no material) (see e.g., 222 in FIG. 2C), within which the back cover support plate (214) and a first (or back cover) mobile computing device (216) may be fitted (discussed below). Moreover, the back shock frame may overlay a portion of the IPU, and subsequently, a portion of the power bridge cable (204) when included (see e.g., FIGS. 4C and 4D). In one embodiment of the invention, the back cover shock frame may be manufactured using materials that include, but are not limited to, silicone rubber and other elastomeric polymers.

Figure 2C:
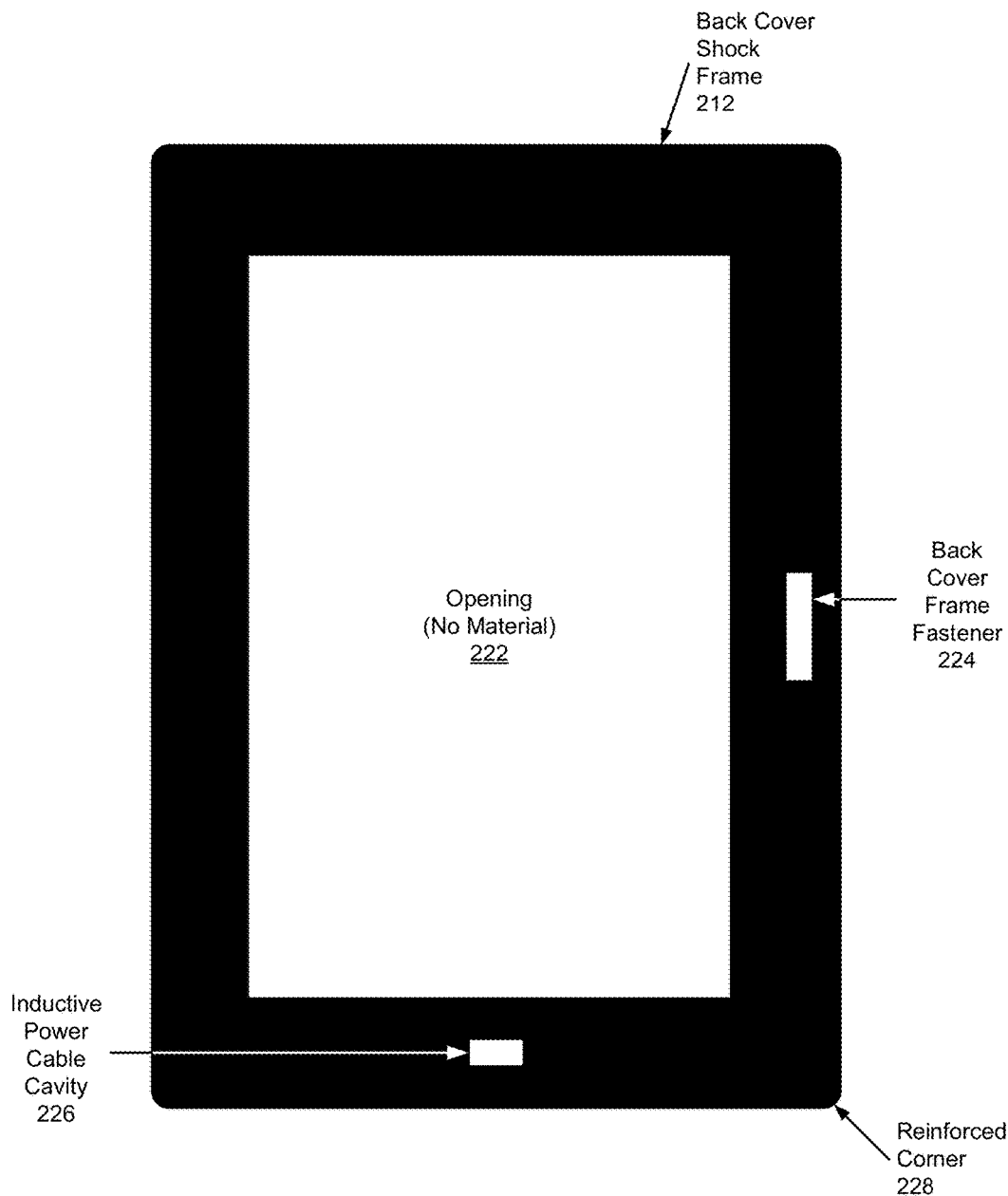
FIG. 2C shows a back cover shock frame in accordance with one or more embodiments of the invention.

In one embodiment of the invention, the back cover shock frame (212) may further be decomposed into various elements. FIG. 2C shows a back cover shock frame in accordance with one or more embodiments of the invention. As presented, the back cover shock frame includes a back cover frame fastener (224), an inductive power cable cavity (226), and one or more reinforced corner(s) (228). Each of these elements is described below.

In one embodiment of the invention, the back cover frame fastener (224) may be integrated into (or onto), and situated along a length (furthest from the binding spine) of, the back cover shock frame (212). The back cover frame fastener may be any hardware device, which when combined with a similar yet complementing front cover frame fastener (discussed below), implements a mechanism that secures the apparatus in a closed configuration (e.g., joins the back cover assembly and the front cover assembly together). Examples of the aforementioned hardware device(s) may include, but are not limited to, buckles, buttons, latches, straps, and magnets.

Figure 4A:
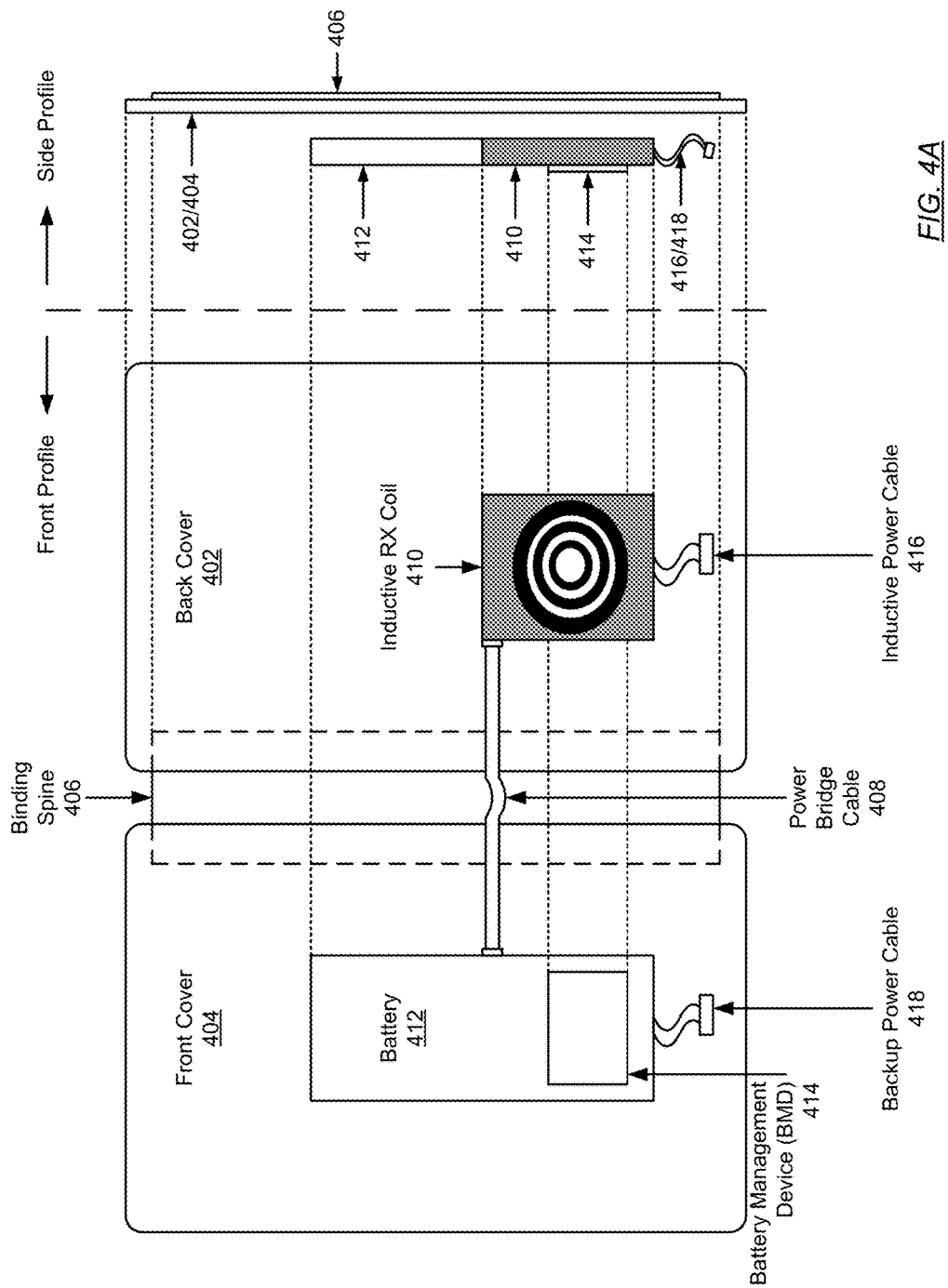
FIG. 4A shows front and side profiles of a first framework of an apparatus in accordance with one or more embodiments of the invention.
Figure 4B:
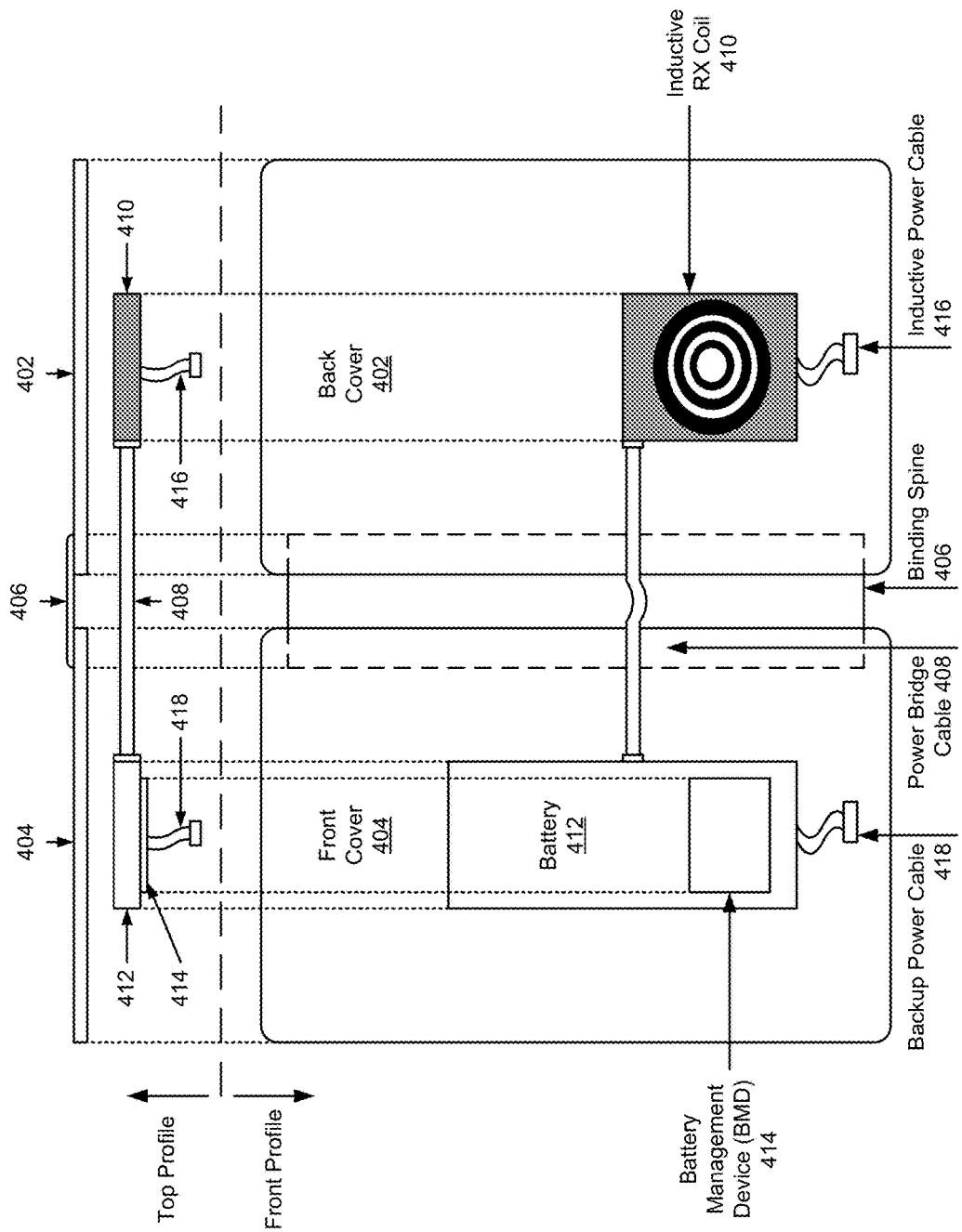
FIG. 4B shows front and top profiles of a first framework of an apparatus in accordance with one or more embodiments of the invention.
Figure 4C:
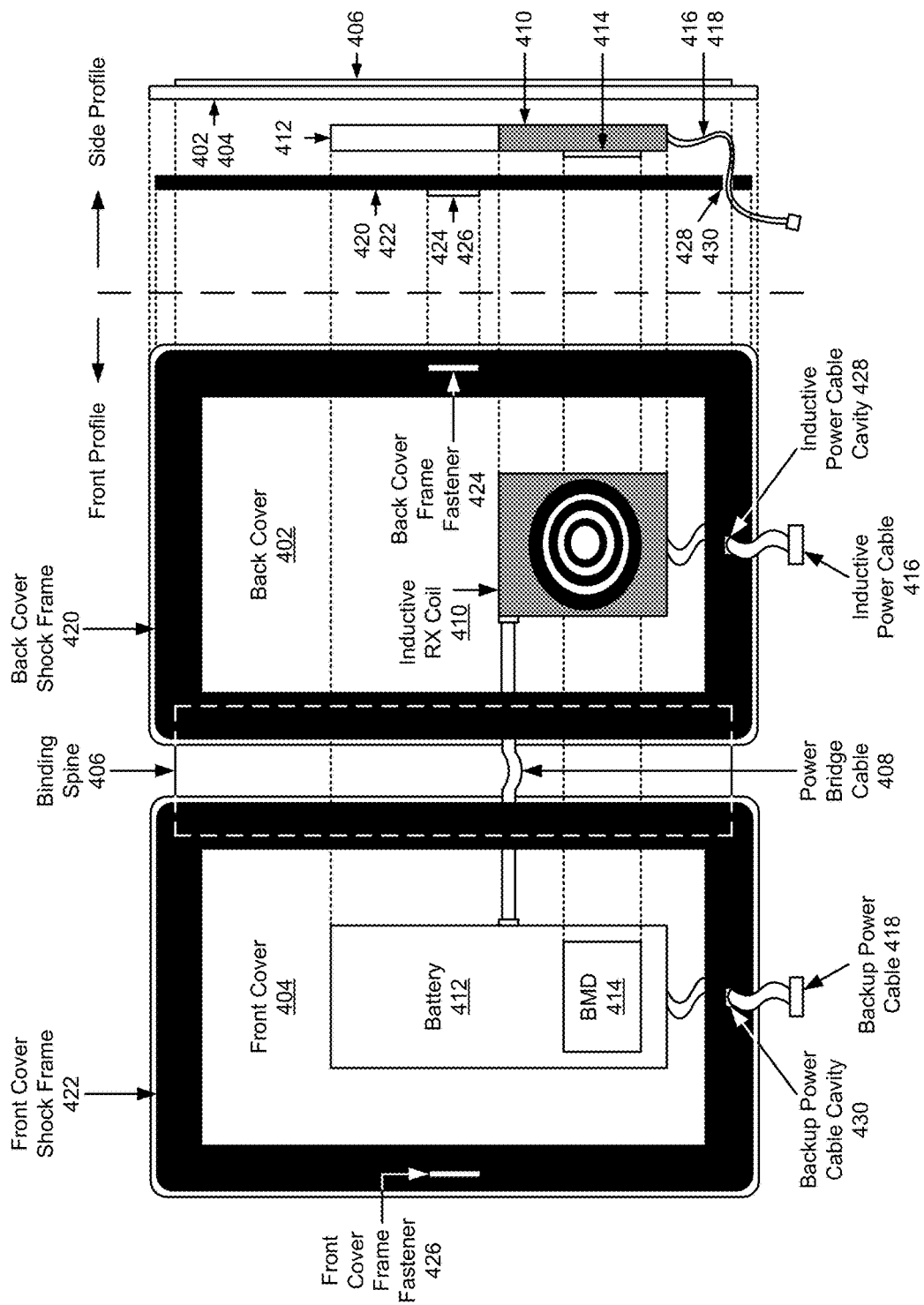
FIG. 4C shows front and side profiles of a second framework of an apparatus in accordance with one or more embodiments of the invention.
Figure 4D:
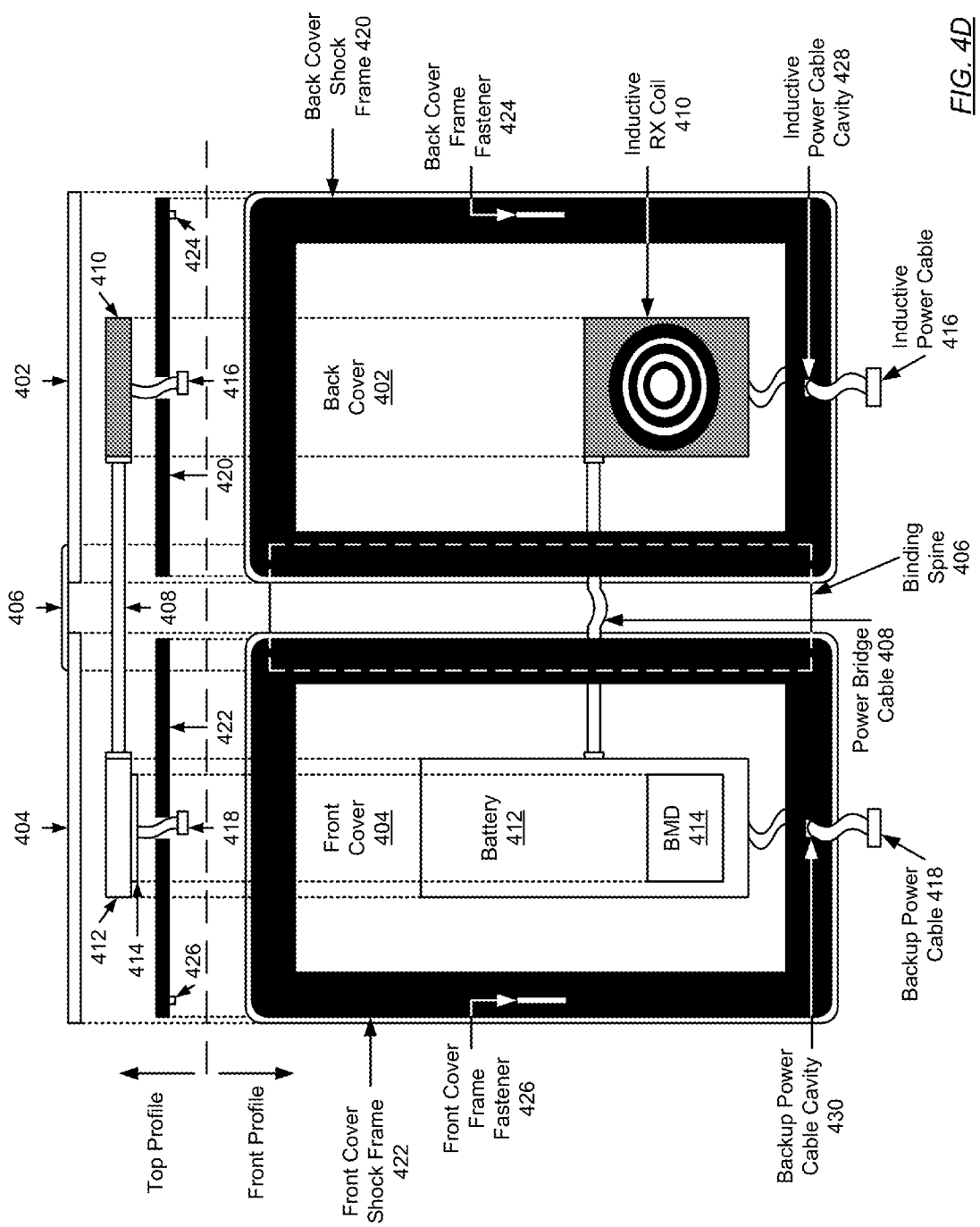
FIG. 4D shows front and top profiles of a second framework of an apparatus in accordance with one or more embodiments of the invention.

In one embodiment of the invention, the inductive power cable cavity (226) represents an cavity through the thickness, and along a width, of the back cover shock frame (212) (see e.g., FIGS. 4C and 4D). Subsequently, at least a portion of the inductive power cable (see e.g., 220 in FIG. 2B) may extend through the aforementioned cavity (from behind an overlaying portion of the back cover shock frame), thereby enabling the operative connection between the inductive power unit (IPU) and a first (or back cover) mobile computing device. As mentioned above, (re)charging of (or the dissemination of direct current (DC) to) the back cover mobile computing device may be facilitated by such a connection.

In one embodiment of the invention, the one or more reinforced corner(s) (228) of the back cover shock frame (212) serve to dampen impact forces sustained by the apparatus when, for example, the apparatus is dropped a specified height from the ground. To accomplish this supplemental protection of various components of the apparatus, as well as the one or two mobile computing device(s), the reinforced corner(s) may be constructed using any existing and/or future developed shock absorbent materials.

Returning to FIG. 2A, the back cover assembly (206) further includes a back cover support plate (214). In one embodiment of the invention, the back cover support plate may be affixed to the inside surface of the back cover (208), along the perimeter of the opening of the back cover shock frame (see e.g., FIG. 2C). Moreover, upon the back cover support plate being affixed, the IPU may lay interposed between said back cover support plate and the back cover. The back cover support plate may serve to prevent bending of the apparatus and/or the first (or back cover) mobile computing device (216). As such, examples of materials from which the back cover support plate may be constructed include, but are not limited to, thermoplastics, aluminum, and other equivalently light but rigid structures.

Figure 2D:
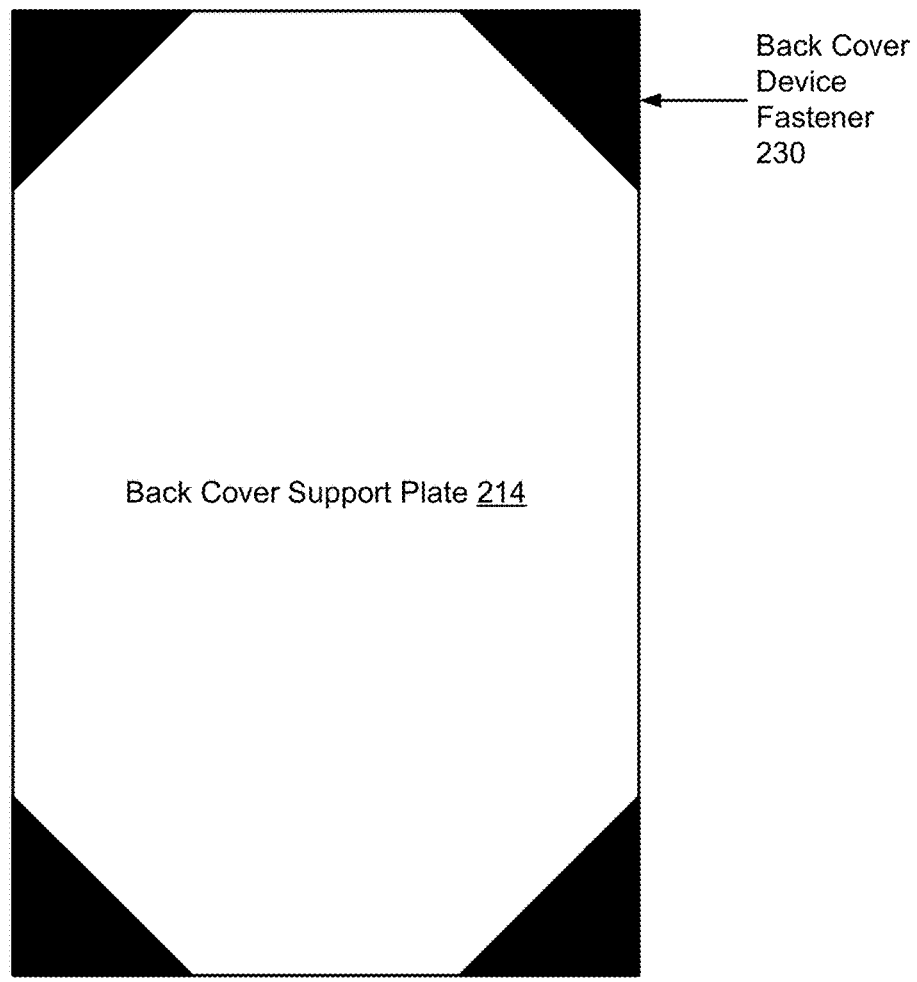
FIG. 2D shows a back cover support plate in accordance with one or more embodiments of the invention.

FIG. 2D shows a back cover support plate in accordance with one or more embodiments of the invention. In one embodiment of the invention, the back cover support plate (214) is at least the same size (e.g., width versus length) of the first (or back cover) mobile computing device. Further, the back cover support plate (214) includes one or more back cover device fastener(s) (230). The back cover device fastener(s) may include functionality to secure the first (or back cover) mobile computing device onto the back cover support plate (and hence, the apparatus).

Figure 3A:
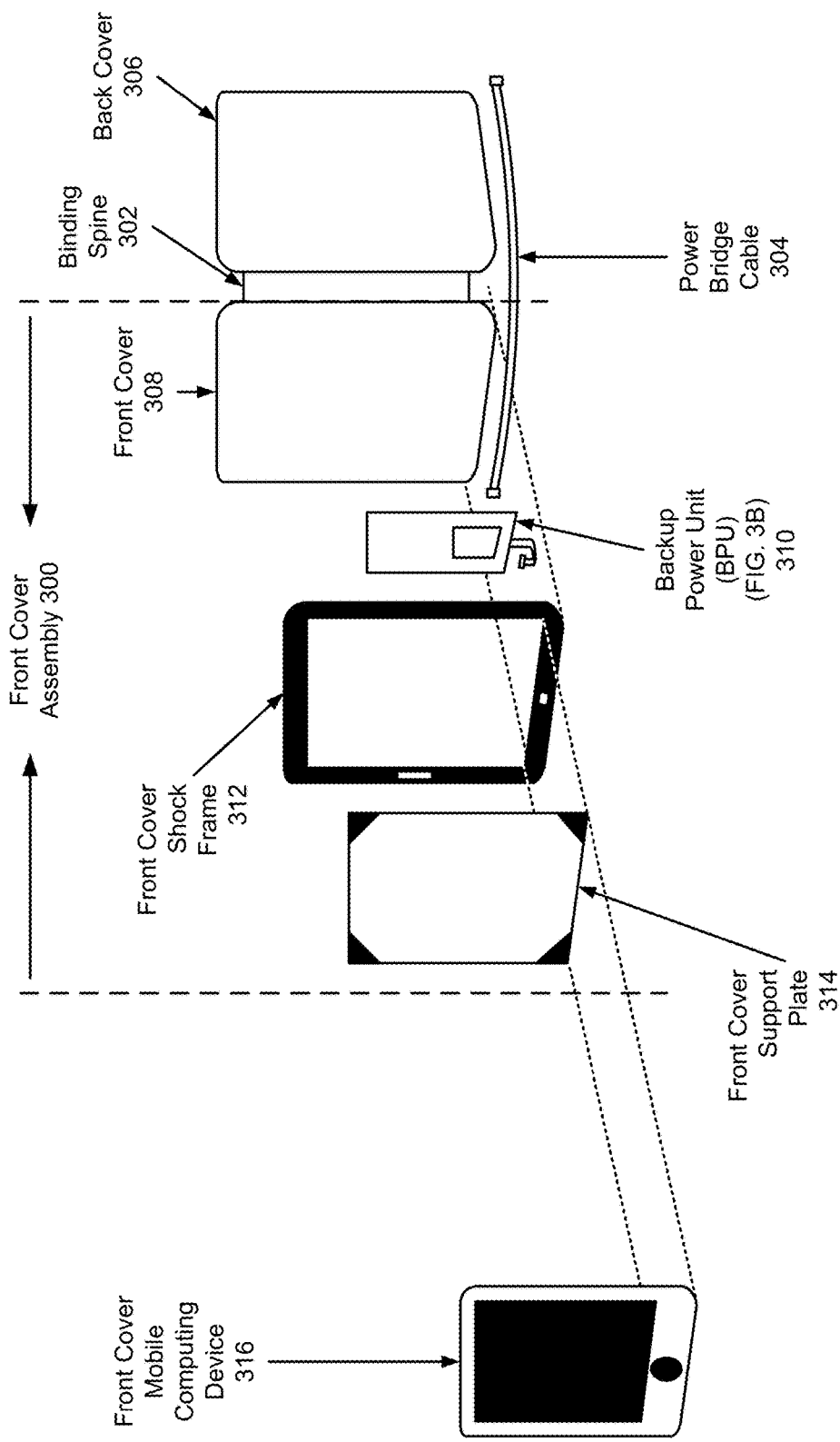
FIG. 3A shows a front cover assembly in accordance with one or more embodiments of the invention.

FIG. 3A shows a front cover assembly in accordance with one or more embodiments of the invention. The front cover assembly (300) includes a front cover (308), a backup power unit (BPU) (310), a front cover shock frame (312), and a front cover support plate (314). Each of these components is described below.

In one embodiment of the invention, the front cover (308), front cover shock frame (312), and front cover support plate (314) are substantially similar to, and include components mirroring, the back cover, back cover shock frame, and back cover support plate, respectively. For details pertaining to these aforementioned components, refer to the discussions with respect to FIGS. 2A and 2C-2D.

In one embodiment of the invention, conversely to the inductive power unit (IPU) enclosed within the back cover assembly (see e.g., FIGS. 2A and 2B), the front cover assembly (300) may include a backup power unit (BPU) (310). Similar to the IPU, however, and with respect to corresponding components of the front cover assembly, the BPU may be: (i) affixed to the inside surface of the front cover (308); (ii) enclosed by the front cover shock frame (312); and (iii) interposed between the front cover support plate (314) and the front cover.

In one embodiment of the invention, the backup power unit (BPU) (310) may be any device that stores direct current (DC). Subsequently, the BPU includes functionality to: (i) receive (and store) DC generated by the IPU; (ii) distribute stored DC appropriately, through the IPU, to (re)charge the first (or back cover) mobile computing device; and (iii) distribute stored DC appropriately, through the backup power cable (discussed below) to (re)charge a second (or front cover) mobile computing device (316). The BPU is described in further detail below with respect to FIG. 3B.

Figure 3B:
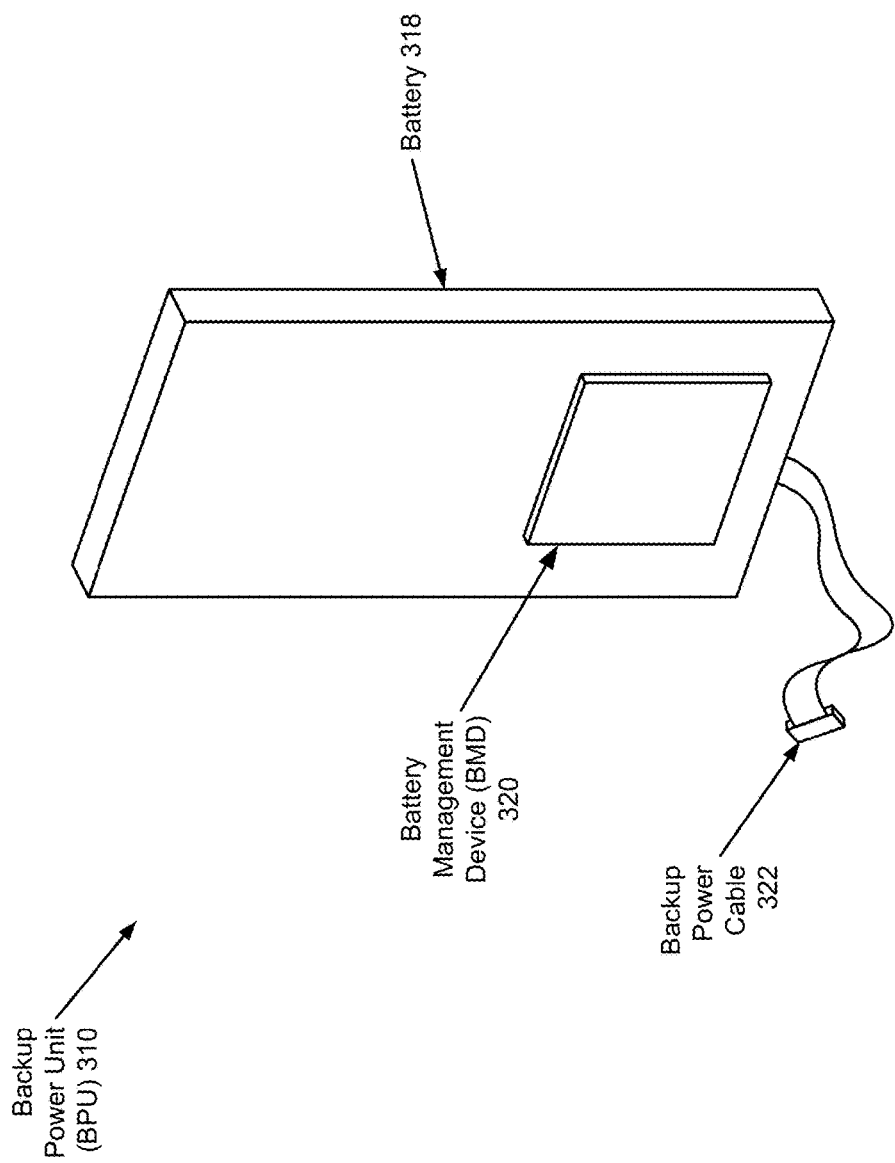
FIG. 3B shows a backup power unit in accordance with one or more embodiments of the invention.

FIG. 3B shows a backup power unit in accordance with one or more embodiments of the invention. The backup power unit (BPU) (310) includes a battery (318), a battery management device (BMD), and a backup power cable (322). Each of these components is described below.

In one embodiment of the invention, the battery (318) may be any portable direct current (DC) power source used to store and/or provide auxiliary power to one or more components of the apparatus. Further, the battery refers to a device capable of distributing an appropriate amount of power to each element to which it is operatively connected (utilizing the BMD (discussed below)). Moreover, the battery may be a device capable of being recharged, wherein DC may be received from the IPU via the power bridge cable.

In one embodiment of the invention, the battery management device (BMD) (320) may be operatively connected to the battery (318). The BMD may include one or more integrated circuits for processing instructions relating to the management of the battery. For example, the BMD may be one or more cores, or micro-cores of a processor. Additionally, or alternatively, the processing in the BMD may be performed using an ASIC, FPGA, or any other type of integrated circuit. The BMD may include one or more sensors (not shown) to gather pertinent information (e.g., current, voltage, etc.) necessary towards efficiently charging and discharging DC in order to, for example, prolong the life of the battery.

In one embodiment of the invention, the backup power cable (322) may be operatively connected to the battery (318), and hence, the battery management device (BMD) (320). The backup power cable, in its composition and functionalities, is substantially similar to the inductive power cable described above. The backup power cable, however, serves as a physical medium through which DC may be provided to a second (or front cover) mobile computing device.

FIGS. 4A-4D show frameworks of the apparatus in accordance with one or more embodiments of the invention. More specifically, FIG. 4A portrays the front and side profiles of the apparatus, and a portion of its various components as they would be situated with respect to each other. FIG. 4B portrays the same components as FIG. 4A, however, also depicts a top profile (or perspective). In FIG. 4C, the back cover and front cover shock frames (420, 422) are introduced into the apparatus framework shown in FIGS. 4A and 4B. As shown, the back cover shock frame (420), and similarly, the front cover shock frame (422), overlays and encloses the IPU and BPU, respectively. It is further conveyed that the power bridge cable (408), operatively connecting the IPU and the BPU, may be partially enclosed by the back and front cover shock frames. With the side profile in FIG. 4C, and the top profile in FIG. 4D, in mind, one may view the significance of the inductive and backup power cable cavities (428, 430) (as described above) towards providing a way through which the inductive and backup power cables (416, 418) may extend through and connect with their respective mobile computing devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
   a back cover assembly comprising a back cover, a back cover shock frame comprising a first opening, a back cover support plate, and an inductive power unit (IPU); and
   a front cover assembly comprising a front cover, a front cover shock frame comprising a second opening, and a backup power unit (BPU),
   wherein the IPU affixes to an inside surface of the back cover and comprises an inductive receiving (RX) coil operatively connected to an inductive power cable,
   wherein the inductive power cable is a physical conduit configured to provide power from the inductive RX coil to a computing device in contact with the inductive power cable,
   wherein the back cover shock frame affixes to a perimeter of the inside surface of the back cover,
   wherein the first opening of the back cover shock frame exposes an area of the inside surface of the back cover,
   wherein the area of the inside surface of the back cover accommodates the IPU and the back cover support plate therein,
   wherein the front cover shock frame affixes to a perimeter of an inside surface of the front cover and borders the BPU,
   wherein the second opening of the front cover shock frame exposes an area of the inside surface of the front cover,
   wherein the area of the inside surface of the front cover accommodates the BPU therein,
   wherein a binding spine attaches the back cover assembly to the front cover assembly.

2. The apparatus of claim 1, wherein the back cover shock frame borders the IPU and the back cover support plate, wherein the IPU is interposed between the back cover and the back cover support plate within the first opening of the back cover shock frame.

3. The apparatus of claim 1, wherein the BPU is operatively connected to the IPU.

4. The apparatus of claim 3, further comprising: a power bridge cable connecting the IPU to the BPU.

5. The apparatus of claim 3, wherein the BPU comprises a battery, a battery management device (BMD) configured to manage the battery, and a backup power cable operatively connected to the battery.

6. The apparatus of claim 3, wherein the BPU is configured to provide direct current (DC) to the IPU, wherein the IPU comprises an inductive power cable configured to receive the DC.

7. The apparatus of claim 3, wherein the BPU is configured to receive direct current (DC) from the IPU, wherein the IPU comprises an inductive receiving (RX) coil configured to generate DC.

8. The apparatus of claim 1, wherein the back cover shock frame borders the IPU and the back cover support plate, wherein the back cover shock frame further comprises an inductive power cable cavity that extends through a thickness of the back cover shock frame, wherein at least a portion of the inductive power cable extends through the inductive power cable cavity.

9. The apparatus of claim 1, wherein the front cover assembly further comprises:
   a front cover support plate,
   wherein the area of the inside surface of the front cover further accommodates the front cover support plate therein,
   wherein the BPU is interposed between the front cover and the front cover support plate.

10. The apparatus of claim 1, wherein the BPU comprises a battery, a battery management device (BMD) configured to manage the battery, and a backup power cable operatively connected to the battery.

11. The apparatus of claim 1, wherein the front cover shock frame further comprises a backup power cable cavity that extends through a thickness of the front cover shock frame, wherein at least a portion of the backup power cable extends through the backup power cable cavity.

12. The apparatus of claim 1, wherein the front cover shock frame further comprises a plurality of corners, wherein at least one of the plurality of corners comprises shock absorbent material.

13. The apparatus of claim 1, wherein the back cover shock frame borders the IPU and the back cover support plate, wherein the back cover shock frame comprises a plurality of corners, wherein at least one of the plurality of corners comprises shock absorbent material.

* * * * *